UNITED STATES PATENT OFFICE.

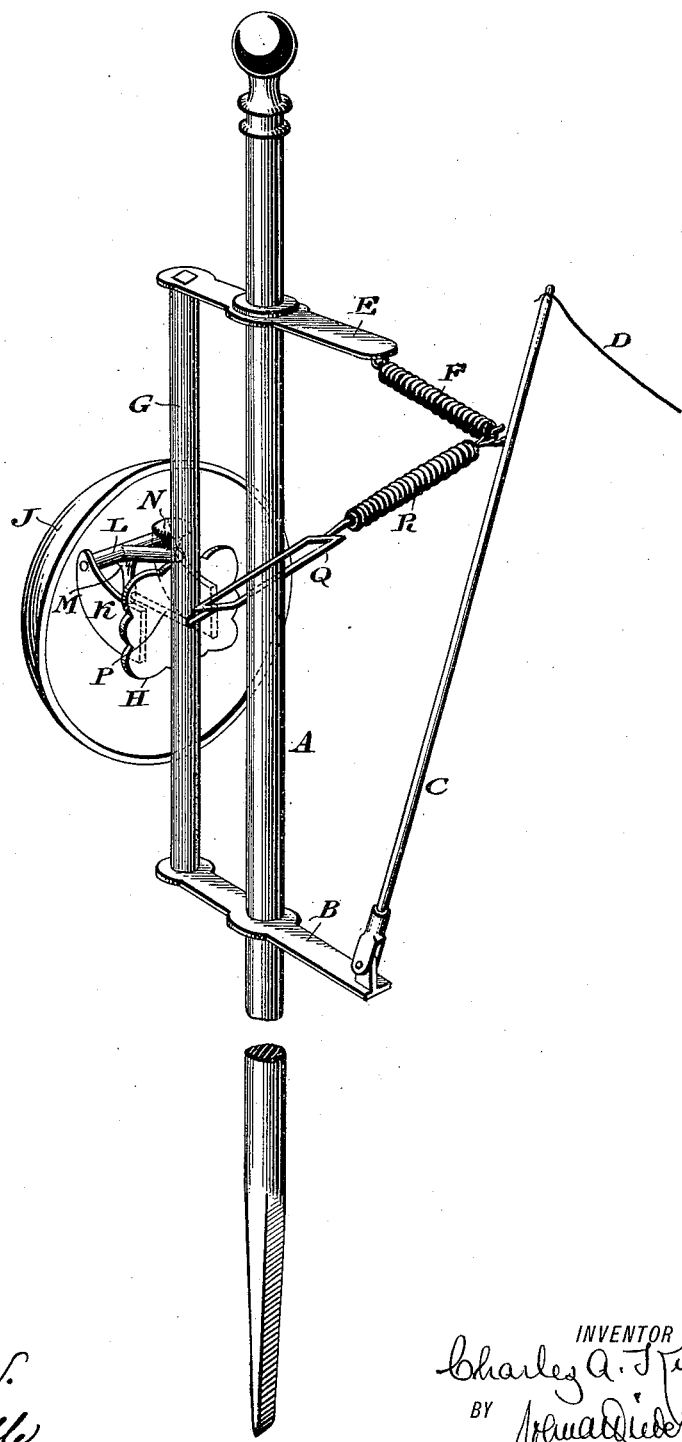

CHARLES A. KÜNZEL, OF CAMDEN, NEW JERSEY, ASSIGNOR OF ONE-HALF TO CHARLES F. ELSER, OF PHILADELPHIA, PENNSYLVANIA.

FISHING DEVICE.

SPECIFICATION forming part of Letters Patent No. 467,122, dated January 12, 1892.

Application filed June 11, 1891. Serial No. 395,885. (No model.)

*To all whom it may concern:*

Be it known that I, CHARLES A. KÜNZEL, a citizen of the United States, residing in the city and county of Camden, State of New Jersey, have invented a new and useful Improvement in Fishing Devices, which improvement is fully set forth in the following specification and accompanying drawing.

My invention relates to improvements in fishing devices; and it consists of means for insuring the proper setting of the hammer-arm of a gong or bell connected therewith after a ringing of the bell.

It further consists of the combination of parts hereinafter set forth.

In the figure in the drawing, which represents a perspective view of a device embodying my invention, A designates a standard, and B a cross-bar on the same. An arm C is pivoted to said bar, and has at its upper end a fishing-line D secured thereto. To a cross-bar E on the standard is attached one end of a contractile spring F, the other end of which is connected with the said arm C. To a bar G, supported by the cross-bars B and E, is secured a bracket H, having a bell or gong J thereon. The said bracket is provided with the lugs K, in which is journaled a shaft L, carrying a projecting arm M and the hammer-arm N. The arm M is connected with a wire P, passing through the bar G and secured to one end of the slotted bar or frame Q, which embraces the standard A and is movable thereon, the other end of the said frame being connected by the coil-spring R with the arm C.

It will be seen that the pulling on the hook end of the line D will so move the arm C, and consequently the spring R, frame Q, and wire P, as to rotate by means of the arm M the shaft L, thereby bringing the hammer on the hammer-arm N in contact with the bell, thus sounding an alarm.

As soon as the pulling on the line D ceases, the spring F causes the arm C to return to its normal position, and the spring R, being returned to its first position and no longer being drawn out or expanded, will move the frame Q and the wire P, so that the shaft L will carry the hammer-arm N away from the sides of the bell, thereby placing the said hammer-arm in readiness for another stroke.

Having thus described my invention, what I claim as new, and desire to secure by Letters Patent, is—

1. A fishing device consisting of a standard, cross-bars thereon supporting a vertical bar, a spring-controlled arm pivoted to one of said cross-bars and adapted to have a fishing-line attached thereto, a gong with pivoted arm secured to said vertical bar, and means connected with the pivoted arm of the gong for insuring the return thereof to its normal position after a stroke, all combined substantially as described.

2. A fishing device consisting of a standard, cross-bars thereon supporting a vertical rod, a spring-controlled arm pivoted to one of said cross-bars and adapted to have a fishing-line attached thereto, a gong having a support attached to said bar, a hammer-arm, a frame or bar connected with said hammer-arm, and a spring connected with said frame or bar of the hammer-arm and to the said pivoted fishing-line arm, said parts being combined substantially as described.

CHARLES A. KÜNZEL.

Witnesses:
JOHN A. WIEDERSHEIM,
A. P. JENNINGS.